Nov. 24, 1964 R. K. AREND ETAL 3,158,432

TAG PRINTERS

Filed Jan. 10, 1963

INVENTORS
ROBERT K. AREND
WILLIAM R. HORST
BY Louis A. Kline
Richard W. Lavin
HIS ATTORNEYS United States Patent Office 3,158,432

Patented Nov. 24, 1964

3,158,432
TAG PRINTERS

Robert K. Arend, Xenia, and William R. Horst, Spring Valley, Ohio, assignors to The National Cash Register Company, Dayton, Ohio, a corporation of Maryland Filed Jan. 10, 1963, Ser. No. 250,687
1 Claim. (Cl. 346—108)

This invention relates to a mechanism for recording information contained in a punched merchandise tag and more particularly relates to a device which reproduces, on a light-sensitive recording material, the image of punched holes contained in a merchandise tag, with the punched holes represented by dark areas as contrasted with the remainder of the tag, represented by light areas, the recording material to be processed by an optical reader for the reading of the information contained in the merchandise tag as represented by the punched holes.

As disclosed in the United States patent to Richard L. Ditmer et al., No. 3,014,647, issued December 26, 1961, data relating to the sales of merchandise is represented by holes punched in a tag attached to the merchandise. As part of this sales transaction, the punched tag is read by a tag reader, the information resulting therefrom being reproduced in the form of punched paper tape. The tapes then are used with a computer to complete the data-processing procedure.

With the introduction of optical reading equipment as an input device for an electronic computer, an opportunity was presented for simplifying the number of steps required in the data-processing system using the merchandise tags without sacrificing any of its desirable features.

Therefore it is an object of this invention to provide a printing mechanism for registering on a tape the punched holes of a merchandise tag in such a manner that the tape may be read by an optical reader for reading the information represented by the punched holes.

It is another object of this invention to produce a tag printer which provides an accurate reproduction of the holes punched in the merchandise tag.

A further object of this invention is to provide a tag printer which is simple in construction and is capable of rapid operation.

With these and other, incidental, objects in view, the invention includes certain novel features of construction and combinations of parts, a preferred form or embodiment of which is hereinafter described with reference to the drawing which accompanies and forms a part of this specification.

Figures 1, 2:
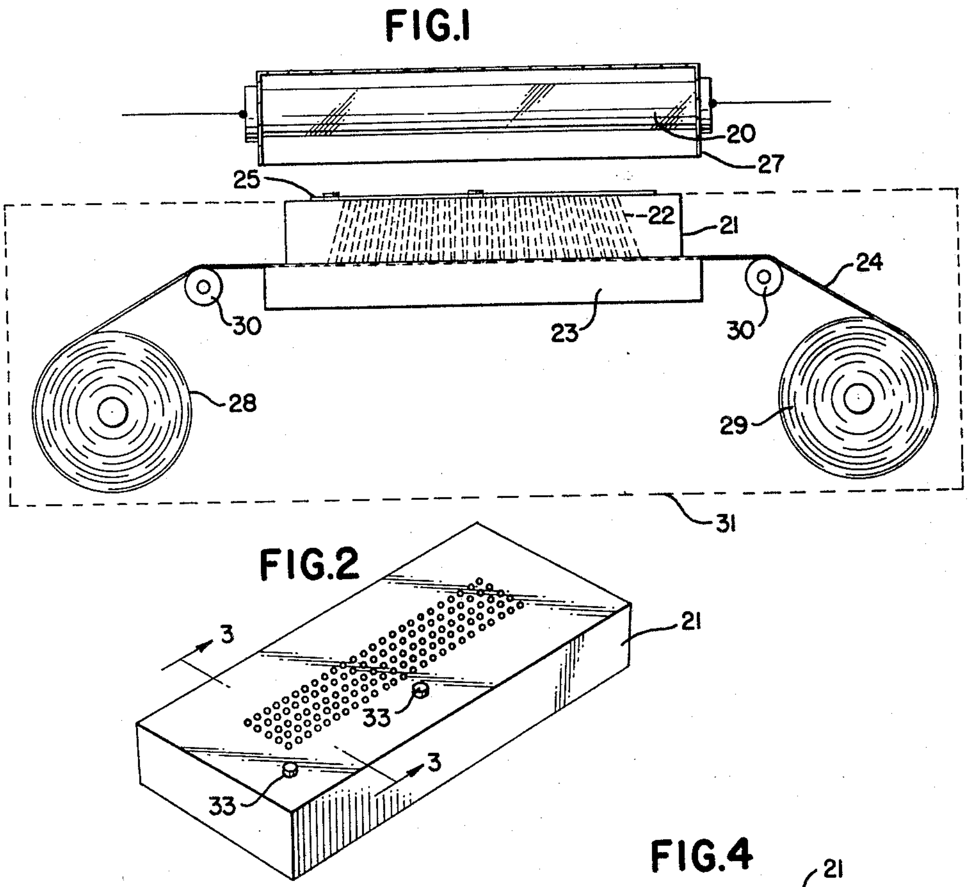
FIG. 1 is a side view of a tag printer showing the supply and take-up reels of the light-sensitive tape.
FIG. 2 is an oblique view of the light pipe block.

The tag printer as disclosed in FIG. 1 is composed essentially of a light source 20, a matrix block 21 containing a plurality of glass pipes 22, which function to orientate the light energy from the source 20, a support member 23, on which the block 21 is located, and a tape 24, having a light-sensitive coating and guided for movement on said support member 23.

Figure 5:
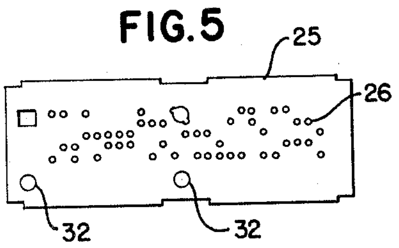
FIG. 5 is a view of a merchandise tag showing an arrangement of punched holes representing data.

FIG. 5 shows a typical merchandise tag 25 having a plurality of data-representing punched holes 26. In the operation of the tag printer, the merchandise tag 25 is placed on the matrix block 21 and is so orientated that the punched holes are aligned with certain of the glass pipes 22 located in the block 21. The method of orientating the tag will be described hereinafter. The light source 20 is then energized. The light waves thus emitted pass through the punched holes of the merchandise tag, through those glass pipes in registry with the holes, to the light-sensitive coating on the tape 24. The light, striking the coating, produces a reaction between the materials which constitute the coating, resulting in one of the materials turning to a distinctive color as compared to those areas not subjected to the light rays. Thus a reproduction of the punched holes in the merchandise tag is formed on the tape, which tape may subsequently be read by an optical reader of the type operating on a principle of differentiating between light and dark areas.

The light source 20 used in the printer is a General Electric 500-watt quartz-lined lamp which produces the required intensity and uniformity of radiation over the length of the merchandise tag. A polished aluminum reflector 27 (FIG. 1) is used to increase the amount of radiation reaching the glass pipes 22 and in turn the tape 24. The distance between the lamp and the tape can be varied, depending on the time of exposure required and the type of coating used on the tape. In the present example, using a coating containing the dye derivative N-(2,5-dichlorophenyl)leucauramine, as disclosed more fully hereinafter, positioning of the lamp three quarters of an inch from the tape produced a one-half-second exposure requirement.

Figure 3:
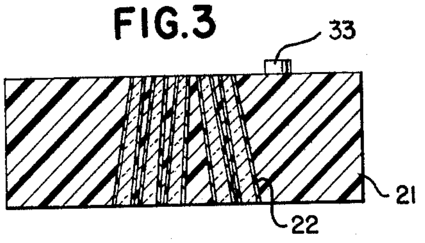
FIG. 3 is a sectional view of the light pipe block taken along the line 3—3 of FIG. 2.
Figure 4:
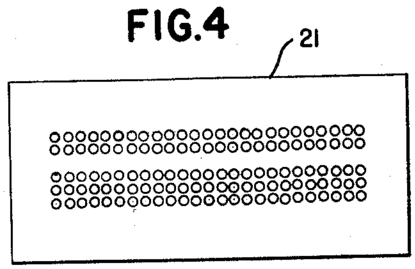
FIG. 4 is a bottom plan view of the light pipe block, showing a typical arrangement of the light pipes.

The matrix block 21 consists of a number of glass pipes 22 potted in a well-known epoxy resin composition, such as, for example, one consisting of the reaction products of epon 828 and polyamide liquid resin #2 (Versamid 125, sold by General Mills). The glass rods are constructed of Pyrex glass cladded with a material consisting of Kel F820 (20% in ethyl acetate). The cladding material, which functions to prevent the escape of light rays through the side of the glass pipes, thus insuring maximum light transfer from the light source 20 to the tape 24, must have an index of refraction lower than that of the material of which the glass pipes are made. In constructing the block 21, a framework consisting of walls of thin acrylic is built. Holes are then drilled in the top and bottom of the framework to form a full matrix for the input at the top and the output at the bottom. The Pyrex pipes, each two millimeters in diameter, are then drawn out to a taper, as shown in FIG. 3. The small ends of the tapered glass pipes are affixed in the matrix at the top of the block, the diameter of the smaller ends corresponding to the diameter of the punched holes in the merchandise tag, while the larger ends are affixed in the matrix at the bottom of the block, the diameter of the larger ends corresponding to the diameter of the holes capable of being read by the optical reader equipment that is used. As seen in FIGS. 1 and 3, the tapered glass pipes are also slanted to correspond, at the top end, to the positional code of the punched holes in the merchandise tag, while the bottom ends correspond to the positional code of the holes capable of being read by the associated optical reader. It is obvious that this arrangement can be eliminated or altered, depending on the punching code used in the merchandise tag and the type of optical equipment used.

After the glass pipes have been so positioned, the cladding material is poured into the cavity formed between the glass pipes, and then is poured out almost immediately, resulting in a coating of cladding material being deposited on the outside of the glass pipes. After the coating has dried, the epoxy compound is then poured into the cavity formed between the glass pipes to fill the space within the framework. The framework then is set in an oven to allow the epoxy compound to harden at a temperature of 150 degrees Fahrenheit. After the epoxy compound has hardened sufficiently, the glass pipes protruding from the top and bottom of the block are ground down to the surface of the epoxy block and then are polished until both the pipes and the surface of the epoxy block are as flat as possible.

The tape 24 used to record the image of the punched holes in the merchandise tag consists of an acetate base on which is applied, by conventional means, a coating consisting of a solution of 0.8 gram of a leucauramine dye derivative, N-(2,5-dichlorophenyl) leucauramine, 20 milliliters of 10% polystyrene in a toluene solution, and 2 grams of carbon tetrabromide, the solution drying to a homogeneous coating upon the evaporation of the toluene solvent.

The compound N-(2,5-dichlorophenyl) leucauramine is of the type that is disclosed in United States Letters Patent No. 2,828,341, issued to Clyde S. Adams et al. on March 25, 1958. Another coloring material which may be used is crystal violet lactone, which may be prepared in the manner disclosed in United States Reissue Letters Patent No. 23,024, reissued August 17, 1948, which was granted originally on the application of Clyde S. Adams. With this arrangement, light transmitted through the punched holes of the merchandise tag and the correspondingly orientated glass pipes strikes the light-sensitive coating on the acetate tape, resulting in the light-sensitive colorless color-reactive material in the coating turning to a distinctive color by a visible-light-induced reaction between said color-reactive material and the carbon tetrabromide, such materials being in contact with each other. In the case of N-(2,5-dichlorophenyl) leucauramine dye coating, the areas subjected to the light turn blue, while those areas not affected remain a pale yellow.

Referring to FIG. 1, there are shown a supply reel 28 and a take-up reel 29 for the tape, the tape being guided over two guide rollers 30 and the support member 23. The top portion of the support member 23 is recessed to allow for the tape 24 to move from the reel 28 to the reel 29. Th matrix block 21, the support member 23, and the tape system are enclosed within a compartment, indicated by the dotted line 31, which prevents light from normally striking the tape 24. The coating disclosed herein is sufficiently stable to withstand subdued light which would normally be received through the glass pipes 22 located in the block 21 while the printer is not being used. It is contemplated that the light source 20 be supported on a hinged cover mounted on the compartment 31, so that, while not in use, the cover is closed, thus preventing any light from entering the glass pipes 22.

After the tape has been exposed for the recording of the punched holes of the merchandise tag, the tape is used with an optical reader which distinguishes between the dark areas, representing the punched holes of the merchandise tag, and the remainder of the tag, as represented by the light areas. While the normal handling of the exposed tape in subdued light is sufficient to prevent any further color reaction during the reading by the optical reader, the tape may be fixed against further change by exposure to visible light by washing the tape in a solution composed of four parts petroleum ether and one part of toluene.

A critical part of the printing operation is the orientation of the merchandise tag on the block 21 for registry with the top openings of the glass pipes 22. As shown in FIG. 5, each tag has two holes 32, which are normally positioned on two guide posts 33 mounted on the block 21 as shown in FIG. 2. It is obvious that other methods may be used to accomplish this same result.

As will be readily apparent to those skilled in the art, other types of storage media where punched holes are used may be utilized with this printer. Thus, punched paper tape may be used, the only requirement being in each case that the fabric material be sufficient to block out light rays. It is also obvious that many combinations of materials may be used in the formation of the sensitized portion of the tape, while the tape base itself may be of materials other than acetate. The specific disclosure of dyes used in conjunction with carbon tetrabromide is not to be deemed to limit the disclosure, as other dyes acting in the same manner may be used.

What is claimed is:

A printing mechanism for reproducing on a strip of record material the images of punched data-representing holes contained in merchandise tags for use with an optical reader apparatus in a data-processing operation, comprising, in combination, (*a*) a first support member having a recessed portion;

(*b*) a second support member mounted on said first support member and forming a slot with said recessed portion, said second member supporting a plurality of light-channeling open-ended glass pipes, each light-channeling pipe having at least one end positionally oriented to define a field of positionally-coded holes used to represent data on merchandise tags;

(*c*) a record material having a light-sensitive coating, said record material being positioned within said recessed portion and adjacent the other ends of said light-pipes;

(*d*) means located on the second support member for positioning a merchandise tag containing a plurality of data-representing punched holes on said member so as to orientate each of said punched holes with the top opened end of one of said glass pipes;

(*e*) and a light source positioned adjacent said second support member whereby light waves emitted from said source are transmitted through the punched holes of the merchandise tag and their associated glass pipes to the light-sensitive coating of the record material to produce a visible reproduction of the punched holes on the record material.

References Cited in the file of this patent

UNITED STATES PATENTS

| | | |
|---|---|---|
| 2,939,362 | Cole | June 7, 1960 |
| 2,982,175 | Eisler | May 2, 1961 |
| 3,014,647 | Ditmer et al. | Dec. 26, 1961 |
| 3,034,127 | Walling et al. | May 8, 1962 |
| 3,060,789 | Hicks | Oct. 30, 1962 |
| 3,060,805 | Brumley | Oct. 30, 1962 |